(No Model.) 3 Sheets—Sheet 2.

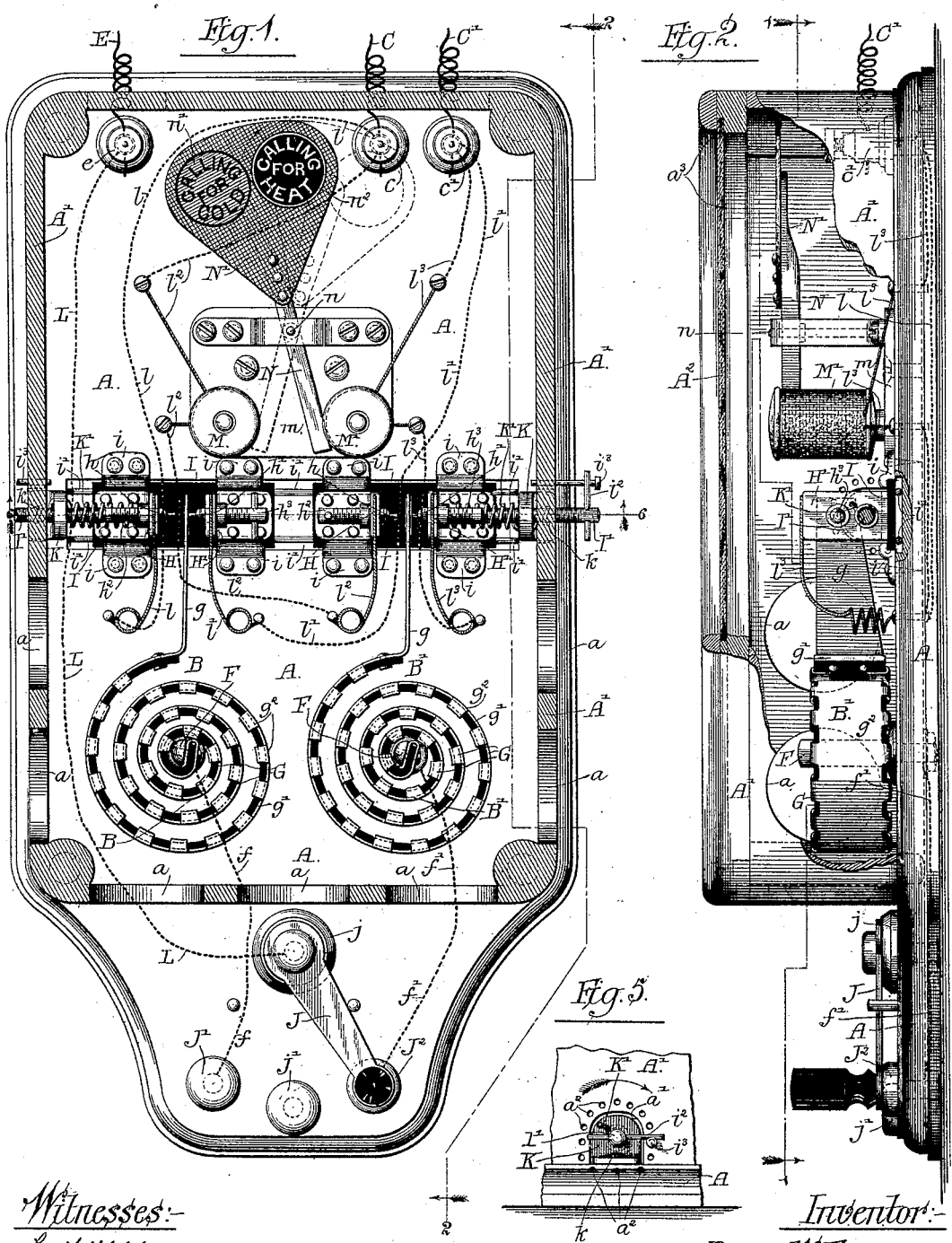

D. W. THOMPSON.
THERMOSTAT.

No. 528,189. Patented Oct. 30, 1894.

Witnesses:
Louis M. F. Whitehead.
Wm. F. Henning.

Inventor:
David W. Thompson.
by Dayton, Poole & Brown
Attorneys.

(No Model.) 3 Sheets—Sheet 3.
D. W. THOMPSON.
THERMOSTAT.
No. 528,189. Patented Oct. 30, 1894.
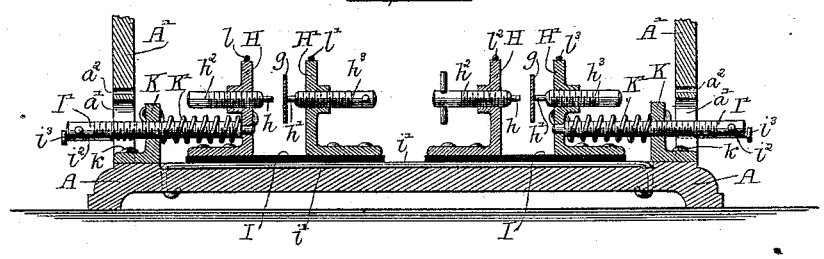
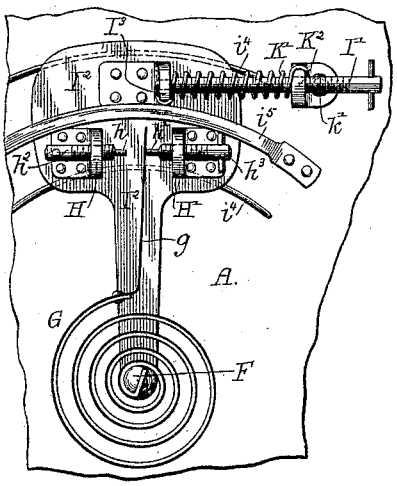
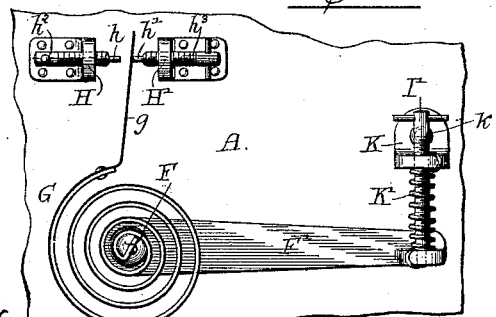
Witnesses:—
Louis M. T. Whitehead.
Wm. F. Heming.
Inventor:—
David W. Thompson.
By Dayton, Poole & Brown
Attorneys.

UNITED STATES PATENT OFFICE.

DAVID W. THOMPSON, OF CHICAGO, ILLINOIS.

THERMOSTAT.

SPECIFICATION forming part of Letters Patent No. 528,189, dated October 30, 1894.

Application filed November 19, 1889. Renewed July 8, 1891. Serial No. 398,775. (No model.)

*To all whom it may concern:*

Be it known that I, DAVID W. THOMPSON, of Chicago, in the county of Cook and State of Illinois, have invented certain new and useful Improvements in Thermostats; and I do declare that the following is a full, clear, and exact description thereof, reference being had to the accompanying drawings, and to the letters of reference marked thereon, which form a part of this specification.

This invention relates to improvements in thermostats, such for instance, as are used in heat regulating apparatus of that class embracing a valve or damper the opening or closing of which affects the temperature of a room or apartment, a motor actuating the said valve or damper, a thermostat and electric connections between the thermostat and motor whereby the latter is controlled from the former. An apparatus of this kind is shown and described, for instance, in United States Letters Patent No. 415,007, granted to me November 12, 1889.

The present invention relates more especially to features of construction in thermostats whereby they may be more easily controlled and adjusted and also includes a novel construction in or attachment to thermostats by which the condition of the same and the position of the damper or valve at any particular time may be indicated to the eye.

The invention consists in the matters hereinafter described and pointed out in the appended claims.

Figure 3:
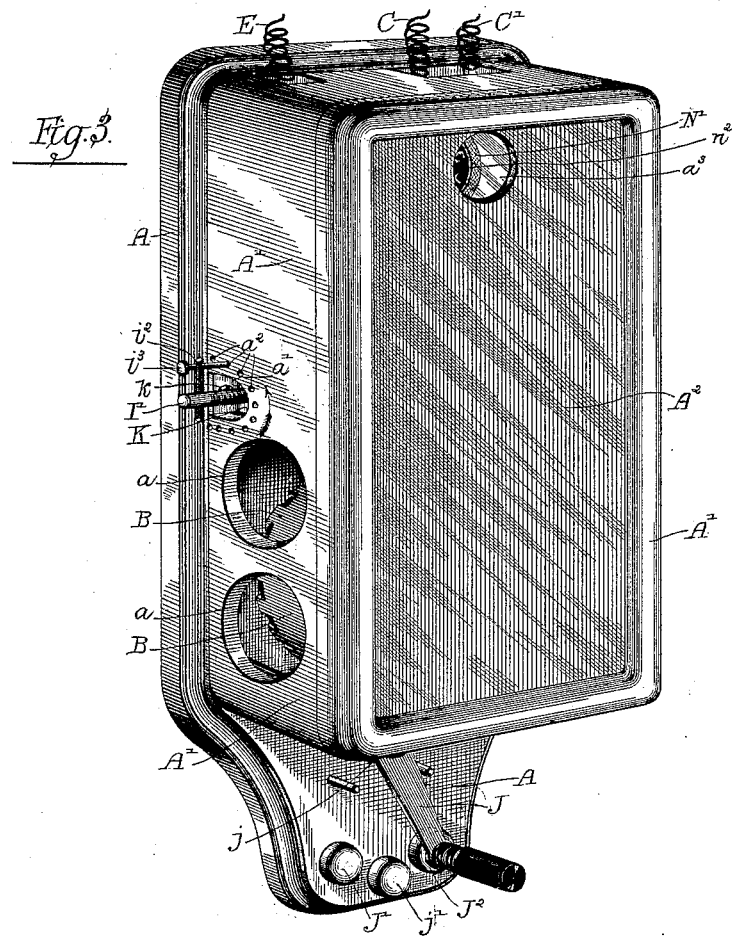
Figure 4:
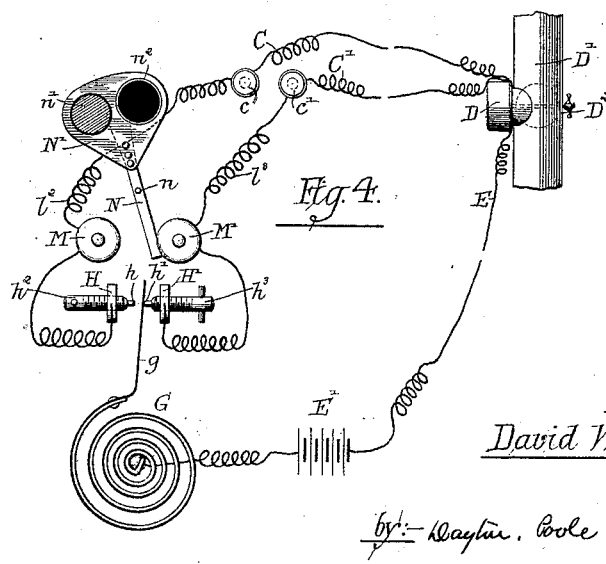

In the accompanying drawings illustrating my invention: Figure 1 illustrates in face view an apparatus embracing a thermostat and indicator, the case inclosing the same being shown in section taken upon line 1—1 of Fig. 2. Fig. 2 is a side elevation of the parts shown in Fig. 1, the casing inclosing the same being broken away as indicated by the dotted lines 2—2 of Fig. 1. Fig. 3 is a perspective view of the exterior of the box or casing shown in Figs. 1 and 2. Fig. 4 is a diagram illustrating the connections of the indicating apparatus with the thermostat and connecting wires leading to the motor and battery. Fig. 5 is a detail elevation of part of the thermostat casing adjacent to one of the adjusting screws of the thermostat. Fig. 6 is a sectional view taken upon line 6—6 of Fig. 1. Figs. 7 and 8 illustrate modifications hereinafter described.

As illustrated in the said drawings, A indicates a base or base board which, in the instance illustrated, supports the thermostat and also the indicating device and is provided with a housing or cover A' having a glass face $A^2$ and provided with openings $a\, a$ in its sides and bottom to allow free access to its interior of the air in the apartment in which the apparatus is placed. The said thermostat is, as herein shown, duplex or provided with two separate and independently operating thermostat coils B B' which are attached to the base-board A. Each one of these thermostats is capable of independently operating the motor which drives the damper by completing an electric circuit through one or the other of two conductors C C' which lead from the thermostat to the motor and are arranged in the same manner as set forth in said prior patent.

The general arrangement of the conducting wires is illustrated in Fig. 4 wherein the conductors C C' are shown as extending to a motor D attached to a smoke or other pipe D' and actuating a damper $D^2$ within said pipe. The details of said motor are not illustrated herein but said motor may be like that illustrated in said prior patent or of other construction.

E is a third or battery wire which extends from the motor to the thermostat and is in circuit with an electric battery E', as shown in said Fig. 4.

Said thermostats B B' are exactly alike, two of them being employed in connection with a switch by which either one or the other may be placed in circuit with the battery and the electro magnet which controls the motor. By employing two separate thermostats arranged in this manner one of the same may be adjusted to move the valve or damper at one temperature and the other at another higher or lower temperature, whereby the apparatus is adapted for maintaining an apartment or house at one temperature in the day time and at another temperature at night without other change than the shifting of the switch.

The thermostats B B' are alike and the parts thereof are lettered the same in the drawings so that a description of one applies equally well to the other. Each of said thermostats embraces a supporting post F and a spirally coiled compound strip G attached at its center to the post and provided with a radial metallic extension or arm $g$ at its outer end.

$h\ h'$ are two contact points which are supported in rigidly connected posts H H' having sliding connection with the base board, said contact points being arranged at opposite sides of the arm $g$. The compound spiral strips G consist of two layers $g'\ g^2$ of substances which expand to a different extent under the influence of heat, the substances used in the device shown being steel and hard rubber. The coils illustrated are constructed in the same manner as those shown and claimed in a separate patent granted to me April 8, 1890, No. 425,114. Variations in temperature operate in a thermostat thus made to swing the arm $g$ into contact with one or the other of the contact points $h\ h'$. The posts H H' are attached to a plate I which is adapted to slide upon the base board A in a direction at right angles to the thermostat arm $g$. For the purpose of insulating the contact points the plate I is herein shown as made of hard rubber or other non-conducting material, but if preferred suitable insulation may be applied at other points between the contact points and the base-board. As a convenient means of supporting the sliding plate I the same is engaged at its edges with metal clips $i\ i$ secured to the base-board. It is obviously desirable that the said plate should slide smoothly or uniformly upon the base-board when moved, and as a cheap and simple means of constructing a smooth guide for the plate I secure to the base-board two wires $i'\ i'$ arranged parallel with each other against the face of the board, in the manner illustrated, the ends of the wires being secured by passing them through the board and clinching them on the under or rear side thereof, in the manner illustrated in Fig. 6 or otherwise. The wires not only serve to guide the plate, but support the same free from the base-board, so that any projections on its under side, which may be formed in the attachment of the posts to the plate, will be prevented from coming in contact with the board. This feature of construction in means for guiding the plate is, as far as I know, a novel one and is herein claimed as part of my invention.

The contact points $h\ h'$ are formed upon the ends of short screw-threaded shafts $h^2\ h^3$ which engage screw-threaded apertures in the posts H H' so that said points may be independently adjusted and the distance between them changed as desired for affording a desired range of movement to the thermostat arm $g$. The bodily adjustment of the posts H H', accomplished by shifting the sliding plate I, is for the purpose of adjusting the device to operate at a higher or lower temperature.

In the apparatus illustrated in my said Patent No. 415,007, for instance, the posts which carry the contact points are stationary and said contact points alone are movable. In a construction of this latter kind it is obviously necessary to move or shift both contact points by turning the same separately in order to adjust the apparatus so that it will operate at a desired temperature. The adjustment of the contact points separately in this manner has the disadvantage not only of taking a longer time and being more troublesome but of changing the distance apart of the points and thus requiring careful adjustment for the purpose of obtaining the desired extent or range of movement in the arm when the latter passes from one contact point to the other.

For the purpose of giving bodily movement to the plate I in adjusting the same, an adjusting screw I' is inserted through a support K which is pivoted by means of a screw $k$ to the base-board and bears against the adjacent post H' upon said plate, while a spiral spring K' is placed around the screw I' and is attached at one end to the post H' and at its opposite end to the support K, so that it acts by its tension to hold the post H' against the said adjusting screw. The adjusting screw is herein shown as reduced in diameter at its inner end, and inserted in a hole in the post H', for the purpose of sustaining the screw in place. The support K is pivoted to the base, in order that the end of the adjusting screw which is engaged with the post H', may move freely in a lateral or sidewise direction, as the plate is moved by the screw, thereby avoiding irregularity of movement in the plate and contact points, such as might be caused by the binding of the adjusting screw on the arm in case the said screw were rigidly supported.

The object of employing the spring K' is to prevent lost motion in the parts which might otherwise occur by reason of a slight looseness or wear in the same. The adjusting screw I' is located at the margin of the base-board and is provided with an arm or lever $i^2$ by which it may be conveniently turned in adjusting the contact points. The several parts mounted on the base-board are herein shown as covered or protected by the casing A', and said casing is provided with openings $a'$ at its side (Fig. 5) through which the adjusting screw I' extends. As a guide for the person adjusting the apparatus, a limiting pin $i^3$ is inserted in one of a series of holes $a^2\ a^2$ formed in the side of the case around the opening $a'$ in position for contact with the lever $i^2$. Such limiting pin is useful for the purpose of showing the extent to which the adjusting screw is turned in adjusting the same, it being entirely obvious that if by noting the readings of a thermometer in an apartment it is found that the turning of the lever $i^2$ to a certain distance, say a quarter of a revolution, affords a change of temperature of one degree, the thermostat may be adjusted with quickness and certainty to afford a desired temperature, either in first starting the apparatus or in adjusting, for a required change of temperature if the same is at any time desired.

J is a switch pivoted on a post $j$ and adapted for engagement with two contact points $J'$ $J^2$ and with an intermediate stud $j'$, which latter is not connected with any conductor and is employed merely as a support for the end of the switch when the latter is free from both contact points. The post F of the thermostat B is connected with the contact point $J'$ by means of a conductor $f$ while the post F of the thermostat $B'$ is connected with the contact point $J^2$ by a conductor $f'$.

L is a conductor leading from the switch post $j$ to the binding post $e$, to which the battery wire E is secured.

$l$ $l'$ are conductors leading from the contact points $h$ $h'$ of the thermostat B to the binding posts $c$ $c'$ to which are connected the conductors C C', and $l^2$ $l^3$ are similar conductors leading from the contact points $h$ $h'$ of the thermostat $B'$ to said binding posts $c$ $c'$ respectively. In the particular construction herein illustrated in Figs. 1, 2 and 6 the conductors $l^2$ $l^3$ of the thermostat $B'$ are in circuit with electro-magnet coils forming part of an indicating device which will be hereinafter fully described. The switch J, in the construction described, obviously affords a means of placing either one or the other of the thermostats B or $B'$ in circuit with the battery, it being obvious that when the said switch J rests on the contact point $J^2$ the thermostat $B'$ will be in circuit and the thermostat B will be idle, and when the said switch is shifted to the contact point $J'$ the thermostat B will be brought into action and the thermostat $B'$ will become inoperative. It follows therefore that when one of the thermostats, as $B'$, is set to give a temperature such as is desired for the daytime and the other, B, is set to give a somewhat lower temperature such as is required during the night, the shifting of the switch J will bring either one or the other of the thermostats into action and give a higher or lower temperature in the room as desired. By resting the switch on the stud $j'$ both thermostats will be cut out and the apparatus will cease to operate.

In the operation of the apparatus excessive heat in the room swings the thermostat arm $g$ against one of the contact points, as $h$, thereby closing the circuit through one of the conductors, as C, which acts upon the motor in such manner as to actuate the valve or damper to decrease the amount of heat supplied to the room. Similarly if the temperature is too low said arm $g$ will come in contact with the other contact point $h'$ thereby closing the circuit through the conductor C' and causing the valve or damper to shift or move to lessen the supply of heat.

One way of accomplishing the movement of the damper, in the manner described, is set forth in my said Patent No. 415,007, but as far as the present invention is concerned other forms of valve actuating device may be employed.

The device herein illustrated for indicating to the eye the condition of the thermostat and damper is constructed as follows:

M M' are two electro magnets the exciting coils of which are in circuit respectively with the conductors C and C' of the temperature regulating apparatus. As shown in Figs. 1 and 2 said magnets are mounted on a plate $m$ which is secured to the base-board A and the conductors $l^2$ $l^3$ which lead from the contact points of the thermostat $B'$ to the binding posts $c$ $c$ and are connected with the coils of said magnets. As shown in Fig. 4, however, the indicating apparatus is remote from the thermostat itself and the main conductors C C' are connected respectively with the coils of the said magnets M M'.

It follows from the above that the indicating device may be placed at any point as may be desired for convenience of inspection. It is shown as placed within the same casing with the thermostat in Figs. 1 and 2 as a mere matter of convenience and because in most instances it will be preferred to have the indicator in the same room with the thermostat.

N is a swinging lever arranged vertically and mounted on a horizontal pivot $n$ in such manner that the lower end of the lever is located between the electro magnets M and M', which latter are located at some distance apart so as to allow considerable amplitude of movement in the lower end of said lever which is adapted to come against and is arrested by contact with said electro magnets at each limit of its movement. At the upper part of said lever N, above the pivot $n$, is secured an indicator card N' having two differently colored or marked portions $n'$ $n^2$ either of which may be brought opposite an opening in or transparent part of the case A', through which the card is visible. As herein shown the glass face $A^2$ is made opaque except at a point opposite said card, as indicated at $a^3$, Fig. 3. The lower end of the lever N is preferably made of steel and permanently magnetized while the coils of the magnets M M' are so wound that the said lever will be attracted toward the magnet through which the electric current passes. The lever is preferably magnetized not only to make its movement more certain but to insure that the said lever and the card carried thereby will remain in the position into which they are carried by the passage of the current through the coils of one of the magnets until positively moved or shifted by the greater attraction of the other magnet.

An indicator constructed and arranged as above described obviously serves to indicate to the observer at a glance as to whether the motor is operating properly. If, for instance, the temperature of the room becomes too low the thermostat should be in position calling for more heat, and if the thermostat has moved properly and thereby established a current through the conductor which is connected with the motor in such manner as to shift the valve or damper in the proper direction to obtain more heat, the passage of the current will have attracted the lever N and shifted the indicator card to show that the apparatus has operated in a proper manner to supply heat to the room. If, therefore, when it is seen that the apparatus has operated properly and the temperature is still too low it will be immediately seen that the trouble lies in some other direction, as for instance, that the fire needs replenishing or has gone out. The changing or shifting of the indicator card also serves to indicate whether or not the regulating apparatus has ceased to operate by reason of the failure of the batteries or from any mechanical or extraneous cause.

The employment of an indicating device of the character described will be of great benefit in cases where it is desired that the condition of the temperature in a number of rooms or apartments in a building should be under the observation of a single person in the building or elsewhere, it being entirely obvious that a person having before him an indicator connected with the several rooms in which the thermostats are located can ascertain therefrom as to whether the several thermostats are operating properly and will also be informed of the sufficiency of heat supply in the building, it being obvious that in case a number of such indicators belonging to different rooms indicate a call for more heat, then the fires are too low to supply the entire building with heat. It will of course be understood in this connection that while a perfect operating temperature regulating device may perfectly control the heat in an apartment when there is a sufficient supply of the same, it can have no effect to maintain the desired temperature when the proper heat supply is lacking.

It is entirely obvious that in the use of the plate I carrying the contact points and having movement in a straight line, the degree of adjustment afforded thereby is limited, because any considerable extent of movement in the sliding plate will bring the arm of the thermostat coil at an angle with the contact points. Where considerable degree of adjustment is desired, therefore, it may be found desirable to employ a construction in which the contact points move bodily in a curved path corresponding or nearly so with the path of the coil arm when moved. A construction of this kind is shown in Fig. 7 in which the posts H H' which support the contact points are mounted on a plate I² which is extended to and pivoted upon the post F of the coil. The adjusting screw I' in this instance passes through a lug K² which is pivoted by means of a screw $k'$ to the base-board and the end of the set screw is engaged with and bears against a stud I³ attached to the plate I². The pivot of the stud K² enables the set-screw to swing or move as the plate I² is shifted. The construction of the adjustable part or plate carrying the contact points, shown in said Fig. 7, in which the same is pivotally supported, so that it moves in a curved path when shifted or moved, possesses important advantages over that shown in Fig. 1 and this construction is therefore claimed as part of my invention. In said Fig. 7, the base-board A is shown as provided with curved wires $i^4$ $i^4$, which are placed over the surface of the board and serve to sustain the plate I² free from the same and to afford a smooth bearing for said plate. A curved strip $i^5$ is preferably employed in this construction to hold the plate in contact with the wires. I secure the lug K' through which passes the adjusting screw I', by means of a pivotal connection in the form of device shown in Fig. 1, in the same manner that lug K² is secured to the base board in the construction shown in Fig. 7 and the purpose of this construction in the two cases is generally the same, to-wit: to allow the plate carrying the contact points to move freely without being affected by the binding of the said screw thereon, or being shifted out of place laterally by action of the set screw thereon. In the construction shown in Fig. 7, the pivoting of the said lugs is absolutely necessary in order to allow the adjusting screw to move in the swinging of the pivot plate, but for obtaining perfect accuracy of adjustment, the pivoting of the lugs in the construction shown in Fig. 1 is also highly important for the reason that it allows the set screw to give or yield freely so that it exerts no pressure upon the adjustable plate carrying the contact points tending to shift the same out of its normal position. By reason of the advantages gained and by pivoting the said lug as hereinbefore stated, a construction involving such pivoting of the lug is herein broadly claimed as part of my invention, the claim covering this feature being intended to embrace the construction shown in Fig. 8 of the accompanying drawings as well as that shown in the other figures thereof.

It is entirely obvious that the same general result produced by mounting the posts which support the contact points on a single movable piece or plate which is pivoted concentrically with the supporting post of the coil or strip, as hereinbefore described, may be accomplished by giving bodily rotative movement to the entire thermostat coil and employing stationary supports for the contact points. A construction of this kind is illustrated in Fig. 8, wherein the posts H H' are shown as secured directly to the base-board of the apparatus and the post F which supports the coil is mounted to turn in the baseboard and is rigidly attached to an arm F', the outer end of which is acted upon by an adjusting screw I' in connection with a spring K' in the same manner as hereinbefore described. The lug or support K in this instance is connected by a pivot screw *k* with the base to give freedom of movement to the inner end of the adjusting screw for the same reason as hereinbefore stated.

The construction illustrated in Fig. 8 is obviously a reversal of that shown in Fig. 1 and therefore the mechanical equivalent of the latter.

It may in some instances be found advantageous to provide bodily adjustment for both the compound strip or coil, and the plate which supports the contact points, and a construction of this kind is also obviously included in my invention.

As far as the indicating device hereinbefore described is concerned, the invention embraces broadly an electrical indicator or indicators connected with the conductors which lead from the contact points of the thermostat and which is or are actuated by the passage of the electric current through one or the other of said conductors to indicate the condition of the apparatus, and inasmuch as this feature of the invention may be carried out by the use of a great number of different forms of indicating devices of the kind heretofore used, or which may be hereafter devised, I do not limit myself to the use of the particular indicating device herein shown. The indicating device illustrated, however, in itself embodies features of novelty and is herein specifically claimed as part of my invention.

I claim as my invention—

1. A thermostat comprising a base or support, a compound strip or coil, independently adjustable contact points, and posts sustaining said contact points rigidly connected with each other, a movable arm or plate to which is attached one of said parts, viz:—the said strip or coil or said rigidly connected post, said movable arm or plate being pivoted to the base so as to turn about a center of rotation coincident with the supporting posts of the strip or coil to afford simultaneous adjustment of both contact points relatively to the coil, an adjusting screw engaged with the base and with said movable arm or plate, and a support for the screw pivoted to the base and adapted to turn freely on the latter, substantially as described.

2. A thermostat comprising a base, a compound coil, a post secured in the base and supporting the coil by attachment to the inner end thereof, independently adjustable contact points located at opposite sides of the free end of the coil, a movable plate supporting said contact points, said plate being pivoted to the base concentrically with the said post, an adjusting screw engaged with said movable plate and a support for the screw pivoted to the base, substantially as described.

3. A thermostat comprising a base, a compound coil, a post secured to the base and supporting the coil by attachment to the inner end thereof, independently adjustable contact points located at opposite sides of the free end of the coil, a movable plate supporting said contact points, said plate being pivoted to the base concentrically with the said post, an adjusting screw engaged with said movable plate, said screw being arranged to bear against a part of or upon said movable plate, and a spring holding the plate in contact with the adjusting screw, substantially as described.

4. A thermostat comprising a base, a compound strip or coil mounted thereon, independently adjustable contact points, a plate sustaining said contact points and movably supported on said base, and an adjusting screw engaged with a support on the base, and with the plate, for adjusting the position of the latter, a radial arm or lever attached to the outer end of said adjusting screw by which it may be turned, and a movable indicating pin adjustable to any point in a circle about the adjusting screw and adapted for contact with the latter, substantially as described.

5. A thermostat comprising a base, a compound strip or coil mounted thereon, independently adjustable contact points, a plate supporting said contact points and movably supported upon the base, and an adjusting screw engaged with the said base and the said movable plate for adjusting the latter, said base being provided with a plurality of wires secured at their ends in the base and placed over the surface of the same to afford bearings for said plate, substantially as described.

6. A heat regulating apparatus, comprising a valve or damper, a motor for actuating the same, two thermostats, each of which embraces a compound strip or coil and two contact points, two conductors leading from the motor to the thermostats and connected by branch conductors with the opposite contact points of both thermostats, a switch provided with three contact points, a third conductor leading from the motor to the pivot of said switch, a battery in circuit with said third conductor, and separate conductors leading from the said compound strips or coils to two of the contact points of said switch, the third contact point of the switch being insulated, whereby either thermostat may be thrown in circuit with the battery as desired or both may be thrown out of action by resting the switch on the insulated contact point, substantially as described.

7. The combination with a thermostat having two contact points, and two electric conductors connected with the said contact points, through either of which conductors an electric circuit may be completed by the action of the thermostat, and an electric indicating apparatus comprising two electro-magnets, the coils of which are in circuit with said conductors, a third intermediate electro-magnet, the coil of which is in circuit with a battery, a key for closing the circuit through the coils of said intermediate magnet, two swinging levers located at opposite sides of the intermediate magnet, and indicator cards or other indicating devices actuated by said levers, substantially as described.

In testimony that I claim the foregoing as my invention I affix my signature in presence of two witnesses.

DAVID W. THOMPSON.

Witnesses:
C. CLARENCE POOLE,
HARRY COBB KENNEDY.